US010384324B2

(12) United States Patent
Shafrir

(10) Patent No.: US 10,384,324 B2
(45) Date of Patent: Aug. 20, 2019

(54) METHODS FOR STRENGTHENING EDGES OF LAMINATED GLASS ARTICLES AND LAMINATED GLASS ARTICLES FORMED THEREFROM

(71) Applicant: CORNING INCORPORATED, Corning, NY (US)

(72) Inventor: Shai Negev Shafrir, Rochester, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/546,975

(22) PCT Filed: Feb. 2, 2016

(86) PCT No.: PCT/US2016/016091
§ 371 (c)(1),
(2) Date: Jul. 27, 2017

(87) PCT Pub. No.: WO2016/126657
PCT Pub. Date: Aug. 11, 2016

(65) Prior Publication Data
US 2018/0001434 A1   Jan. 4, 2018

Related U.S. Application Data

(60) Provisional application No. 62/110,782, filed on Feb. 2, 2015.

(51) Int. Cl.
*B24B 9/10* (2006.01)
*C03C 19/00* (2006.01)
(Continued)

(52) U.S. Cl.
CPC .............. *B24B 9/10* (2013.01); *B24B 29/005* (2013.01); *B24B 37/00* (2013.01); *B32B 17/06* (2013.01);
(Continued)

(58) Field of Classification Search
USPC ................. 156/247, 249, 250, 267
See application file for complete search history.

(56) References Cited

U.S. PATENT DOCUMENTS 3,737,294 A   6/1973   Dumbaugh, Jr.
3,746,526 A   7/1973   Giffon
(Continued)

FOREIGN PATENT DOCUMENTS

CN   102350661 A   2/2012
CN   104973770 A   10/2015
(Continued)

OTHER PUBLICATIONS

International Search Report and Written Opinion of the International Searching Authority; PCT/US2016/016091; dated May 19, 2016; 11 Pages; European Patent Office.
(Continued)

*Primary Examiner* — Sing P Chan
(74) *Attorney, Agent, or Firm* — Svetlana Z. Short

(57) ABSTRACT

Methods for strengthening edges of a laminated glass article comprising a glass core layer positioned between a first glass clad layer and a second glass clad layer are disclosed. The methods may comprise polishing the cut edges of the laminated glass article with a slurry of polishing media applied to the edges of the laminated glass article with brushes. An edge strength of the laminated glass article is greater than or equal to about 400 MPa after polishing.

16 Claims, 17 Drawing Sheets

(51) Int. Cl.
  *B32B 37/12* (2006.01)
  *C03C 17/10* (2006.01)
  *C03B 17/02* (2006.01)
  *C03C 15/02* (2006.01)
  *B24B 37/00* (2012.01)
  *B24B 29/00* (2006.01)
  *B32B 17/06* (2006.01)
  *C03B 18/12* (2006.01)
  *C03C 27/10* (2006.01)
  *B32B 37/10* (2006.01)

(52) U.S. Cl.
  CPC .............. *B32B 37/10* (2013.01); *B32B 37/12* (2013.01); *C03B 17/02* (2013.01); *C03C 15/02* (2013.01); *C03C 19/00* (2013.01); *C03C 27/10* (2013.01); *C03B 18/12* (2013.01); *Y02P 40/57* (2015.11)

(56) References Cited

U.S. PATENT DOCUMENTS

| | | | |
|---|---|---|---|
| 3,849,097 A | 11/1974 | Giffen et al. | |
| 3,931,438 A | 1/1976 | Beall et al. | |
| 4,023,953 A | 5/1977 | Megles, Jr. et al. | |
| 4,102,664 A | 7/1978 | Dumbaugh, Jr. | |
| 4,214,886 A | 7/1980 | Shay et al. | |
| 5,342,426 A | 8/1994 | Dumbaugh, Jr. | |
| 5,559,060 A | 9/1996 | Dumbaugh, Jr. et al. | |
| 7,201,965 B2 * | 4/2007 | Gulati | B32B 17/06 428/1.1 |
| 7,514,149 B2 | 4/2009 | Bocko et al. | |
| 8,002,923 B2 | 8/2011 | Suzuki et al. | |
| 8,007,913 B2 | 8/2011 | Coppola et al. | |
| 9,375,820 B2 | 6/2016 | Hsu et al. | |
| 2003/0077995 A1 * | 4/2003 | Li | B24B 37/044 451/528 |
| 2003/0082999 A1 * | 5/2003 | Yoshikawa | B24B 9/065 451/41 |
| 2009/0038743 A1 | 2/2009 | Suzuki et al. | |
| 2009/0042493 A1 | 2/2009 | Nakiri et al. | |
| 2010/0075129 A1 | 3/2010 | Nagasaki et al. | |
| 2010/0279067 A1 | 11/2010 | Sabia et al. | |
| 2010/0317265 A1 | 12/2010 | Nakiri et al. | |
| 2011/0318994 A1 | 12/2011 | Darcangelo et al. | |
| 2013/0273810 A1 | 10/2013 | Hsu et al. | |
| 2013/0288010 A1 | 10/2013 | Akarapu et al. | |
| 2014/0065401 A1 | 3/2014 | Donovan et al. | |
| 2015/0353412 A1 | 12/2015 | Minami | |

FOREIGN PATENT DOCUMENTS

| | | |
|---|---|---|
| JP | 2010030807 A | 2/2010 |
| JP | 2010269389 A | 12/2010 |
| JP | 2012246182 A | 12/2012 |
| JP | 2013194056 A | 9/2013 |
| JP | 2015091610 A | 5/2015 |
| JP | 05789331 B2 | 10/2015 |
| KR | 2009112824 A | 10/2009 |
| KR | 2011029522 A | 3/2011 |
| KR | 2011029523 A | 3/2011 |
| KR | 2011107181 A | 9/2011 |
| KR | 1107998 B1 | 1/2012 |
| KR | 2012033566 A | 4/2012 |
| KR | 1417993 B1 | 7/2014 |
| KR | 1420263 B1 | 7/2014 |
| KR | 1475394 B1 | 12/2014 |
| WO | 2013042689 A1 | 3/2013 |
| WO | 2013099847 A1 | 7/2013 |
| WO | 2013125652 A1 | 8/2013 |
| WO | 2014013996 A1 | 1/2014 |
| WO | 2014192941 A1 | 12/2014 |
| WO | 2014201318 A1 | 12/2014 |

OTHER PUBLICATIONS

English Translation of TW105103323 Office Action and Search Report dated May 1, 2019, Taiwan Patent Office, 4 Pgs.

* cited by examiner

METHODS FOR STRENGTHENING EDGES OF LAMINATED GLASS ARTICLES AND LAMINATED GLASS ARTICLES FORMED THEREFROM

This application claims the benefit of priority to International Application No. PCT/US2016/016091, filed on Feb. 2, 2016, which claims the benefit of priority to U.S. Application No. 62/110,782, filed on Feb. 2, 2015, the content of each of which is incorporated herein by reference in its entirety.

BACKGROUND

Field

The present specification generally relates to laminated glass articles and, more specifically, to methods for finishing and strengthening the edges of laminated glass articles and laminated glass articles formed therefrom.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Strengthened glass articles may be formed from processes such as chemical tempering, thermal tempering, and lamination. A glass article strengthened by lamination is formed from at least two glass compositions which have different coefficients of thermal expansion. These glass compositions are brought into contact with one another in a molten state to form the glass article and fuse or laminate the glass compositions together. As the glass compositions cool, the difference in the coefficients of thermal expansion cause compressive stresses to develop in at least one of the layers of glass, thereby strengthening the glass article. Lamination processes can also be used to impart or enhance other properties of laminated glass articles, including physical, optical, and chemical properties Various processes may be utilized to produce laminated glass articles, including the fusion lamination process which yields a continuous ribbon of laminated glass. Discrete laminated glass articles may be singulated from the continuous ribbon of laminated glass for incorporation in other devices. For example, the continuous ribbon of laminated glass is singulated or cut to a predetermined size, by either mechanical cutting, laser or thermal scoring and break separation techniques, or combinations thereof depending on a thickness ratio and material selection of the laminated glass, to produce a singulated discrete laminated glass article. The edges of the singulated articles are prone to the formation of defects either during singulation or after, which defects reduce the strength of the glass articles and may lead to breakage.

Accordingly, a need exists for alternative methods for strengthening the scored edges of laminated glass articles and laminated glass articles formed therefrom to increase the edge strength of the laminated glass article.

SUMMARY

According to one embodiment, a method for strengthening an edge of a laminated glass article is described. The laminated glass article may initially be in the form of a laminated glass ribbon which includes a glass core layer positioned between a first glass clad layer and a second glass clad layer. The laminated glass ribbon may be cut or singulated to form one or more laminated glass articles having cut edges. At least two of the laminated glass articles are stacked to form a stack, and the cut edges of the stack may be directly polished such that, after polishing, an edge strength for the laminated glass article is greater than or equal to about 400 MPa.

In another embodiment, a laminated glass article may include a glass core layer, a first glass clad layer fused directly to a first surface of the glass core layer and a second glass clad layer fused directly to a second surface of the glass core layer opposite the first surface. A polished edge of the laminated glass article may have an edge strength that is measurable at a value greater than or equal to 400 MPa.

Additional features and advantages of the methods and laminated glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
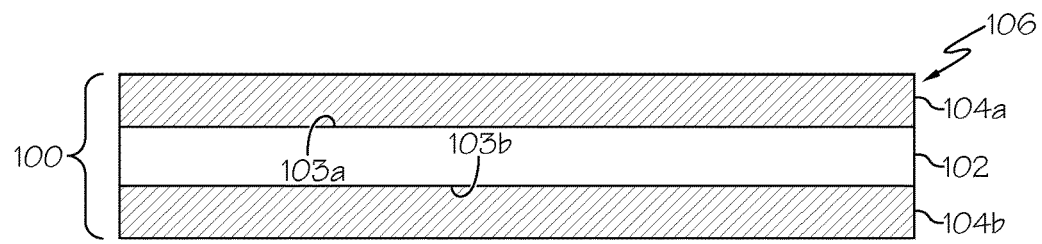
FIG. 1 schematically depicts a cross section of a laminated glass article according to one or more embodiments shown and described herein.

Reference will now be made in detail to embodiments of methods of finishing and strengthening the edges of laminated glass articles and glass articles formed therefrom, examples of which are illustrated in the accompanying drawings. Whenever possible, the same reference numerals will be used throughout the drawings to refer to the same or like parts. One embodiment of a method for strengthening an edge of a laminated glass article is depicted in FIGS. 4-8. In embodiments, the laminated glass article may be strengthened by polishing cut edges of a stack of laminated glass articles using a loose abrasive assist polishing process with or without an intermediate grinding process and with or without a rapid etching process to achieve a target edge strength that is greater than or equal to 400 MPa.

Various embodiments of methods for strengthening the edges of laminated glass articles and laminated glass articles formed therefrom will be described herein with specific reference to the appended drawings.

The term "CTE," as used herein, refers to the coefficient of thermal expansion of the glass composition averaged over a temperature range from about 20° C. to about 300° C. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

Referring now to FIG. 1, a laminated glass article 100 is schematically depicted in cross section. The laminated glass article 100 generally comprises a glass core layer 102 and at least one glass clad layer 104a. In the embodiment of the laminated glass article 100 shown in FIG. 1 the laminated glass article includes a first glass clad layer 104a and a second glass clad layer 104b positioned on opposite sides of the glass core layer 102. While FIG. 1 schematically depicts the laminated glass article 100 as being a laminated glass sheet, it should be understood that other configurations and form factors are contemplated and possible.

In the embodiment of the laminated glass article 100 depicted in FIG. 1, the glass core layer 102 generally comprises a first surface 103a and a second surface 103b which is opposed to the first surface 103a. A first glass clad layer 104a is fused to the first surface 103a of the glass core layer 102 and a second glass clad layer 104b is fused to the second surface 103b of the glass core layer 102. The glass clad layers 104a, 104b are fused to the glass core layer 102 without any additional non-glass materials, such as adhesives, coating layers or the like, being disposed between the glass core layer 102 and the glass clad layers 104a, 104b. Thus, in some embodiments, the glass clad layers 104a, 104b are fused directly to the glass core layer 102 or are directly adjacent to the glass core layer. In some embodiments, the laminated glass article 100 comprises one or more intermediate layers disposed between the glass core layer and the glass clad layer(s). For example, the intermediate layers may comprise intermediate glass layers and/or diffusion layers formed at the interface of the glass core layer and the glass clad layer(s) (e.g., by diffusion of one or more components of the glass core and glass clad layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

In the embodiments of the laminated glass articles described herein, the composition of the glass clad layers 104a, 104b is different than the composition of the glass core layer 102 to achieve specific attributes in the final laminated glass article. For example, in the embodiments described herein, the glass clad layers 104a, 104b are formed from glass compositions which have an average clad coefficient of thermal expansion $CTE_{CL}$ and the glass core layer 102 is formed from a different glass composition which has an average core coefficient of thermal expansion $CTE_C$. The $CTE_C$ is greater than $CTE_{CL}$ (i.e., $CTE_C$ $CTE_{CL}$) which results in the glass clad layers 104a, 104b being compressively stressed without being ion-exchanged or thermally tempered.

For example, in some embodiments, the glass clad layers are formed from glass compositions which have average clad $CTE_{CL}$ less than or equal to about $40 \times 10^{-7}/°$ C. averaged over a range from 20° C. to 300° C. In some embodiments, the average clad $CTE_{CL}$ of the clad glass compositions may be less than or equal to about $37 \times 10^{-7}/°$ C. averaged over a range from 20° C. to 300° C. In yet other embodiments, the average clad $CTE_{CL}$ of the clad glass compositions may be less than or equal to about $35 \times 10^{-7}/°$ C. averaged over a range from 20° C. to 300° C. However, the glass core layer may be formed from glass compositions which have an average coefficient of thermal expansion which is greater than or equal to about $40 \times 10^{-7}/°$ C. in a range from 20° C. to 300° C. In some of these embodiments, the average core $CTE_C$ of the core glass composition of the glass core layer may be greater than or equal to about $60 \times 10^{-7}/°$ C. in a range from 20° C. to 300° C. In yet other embodiments, the average core $CTE_C$ of the glass composition of the glass core layer may be greater than or equal to about $80 \times 10^{-7}/°$ C. averaged over a range from 20° C. to 300° C. In yet other embodiments, the average core $CTE_C$ of the glass composition of the glass core layer may be greater than or equal to about $90\times10^{-7}/°$ C. averaged over a range from 20° C. to 300° C.

In the embodiments described herein, the CTE differential between the glass core layer 102 and the glass clad layers 104a, 104b (i.e., $|CTE_C-CTE_{CL}|$) is sufficient to generate a compressive stress in the clad layers. In some embodiments the CTE differential between the glass core layer and the glass clad layers is greater than or equal to about $20\times10^{-7}/°$ C. or even $30\times10^{-7}/°$ C. In some other embodiments, the CTE differential between the glass core layer and the glass clad layers is greater than or equal to about $40\times10^{-7}/°$ C. or even $50\times10^{-7}/°$ C. In yet other embodiments, the CTE differential between the glass core layer and the glass clad layers is greater than or equal to about $60\times10^{-7}/°$ C. or even $65\times10^{-7}/°$ C.

In some embodiments, one or more of the glass clad layers 104a, 104b may be formed from a glass composition which is less soluble in a particular solution than the glass composition from which the glass core layer 102 is formed, as described in co-pending International Patent Application No. PCT/US2014/042237 filed Jun. 13, 2014 and entitled "Method of Manufacturing Laminated Glass Articles with Improved Edge Condition," which is incorporated herein by reference. This enables a portion of the glass core layer 102 to be selectively removed, such as by chemical etching, while the glass clad layers 104a, 104b remain substantially unaffected. In still other embodiments, the glass clad layers 104a, 104b may contain additional constituent components which alter the optical characteristics of the glass clad layers 104a, 104b relative to the glass core layer. Accordingly, it should be understood that the composition of at least one of the glass clad layers 104a, 104b is different than the composition of the glass core layer 102 to which it is fused.

In some embodiments, the glass core layer may be formed from one of the glass core layer compositions listed in Tables 1A and 1B below. However, it should be understood that other compositions for the glass core layer 102 are contemplated and possible.

TABLE 1A

Exemplary Glass Core Layer Compositions

|  | 1-1 | 1-2 | 1-3 | 1-4 | 1-5 | 1-6 | 1-7 |
|---|---|---|---|---|---|---|---|
| $SiO_2$ | 61.97 | 66.54 | 63.46 | 69.05 | 56.12 | 59.05 | 56.24 |
| $Al_2O_3$ | 10.89 | 10.03 | 9.56 | 10.2 | 16.73 | 15.1 | 14.38 |
| $B_2O_3$ | 10.09 | 6 | 7.09 |  | 10.5 | 6.26 | 7.16 |
| $Na_2O$ | 0.07 | 0.09 | 0.09 | 15.13 | 0.064 | 0.086 | 0.084 |
| $K_2O$ | 2.17 | 5.79 | 5.79 |  | 3.084 | 8.059 | 8.042 |
| MgO | 6.16 | 1.9 | 2.49 | 5.49 | 3.74 | 1.13 | 1.48 |
| CaO | 5.45 | 6.23 | 7.41 |  | 4.61 | 5.16 | 6.13 |
| SrO | 3.09 | 3.28 | 3.95 |  | 4.83 | 5.02 | 6.04 |
| BaO | 0.03 | 0.04 | 0.04 |  | 0.08 | 0.08 | 0.1 |
| $SnO_2$ | 0.04 | 0.07 | 0.07 | 0.13 | 0.092 | 0.151 | 0.164 |
| $ZrO_2$ | 0.01 | 0.02 | 0.03 |  | 0.023 | 0.032 | 0.051 |
| $Fe_2O_3$ | 0.01 | 0.01 | 0.01 |  | 0.033 | 0.031 | 0.032 |
| $As_2O_3$ |  |  |  |  | 0.0002 | 0.0002 | 0.0002 |
| CTE ($\times10^{-7}C^{-1}$) |  |  |  |  | 43.9 | 59.8 | 54.9 |

TABLE 1B

Exemplary Glass Core Layer Compositions

|  | 1-8 | 1-9 | 1-10 |
|---|---|---|---|
| $SiO_2$ | 67.45 | 69.17 | 68.84 |
| $Al_2O_3$ | 12.69 | 8.53 | 10.63 |
| $B_2O_3$ | 3.67 |  |  |
| $Na_2O$ | 13.67 | 13.94 | 14.86 |
| $K_2O$ | 0.02 | 1.17 | 0.02 |
| MgO | 2.36 | 6.45 | 5.43 |
| CaO | 0.03 | 0.54 | 0.04 |
| SrO |  |  |  |
| BaO |  |  |  |
| $SnO_2$ | 0.09 | 0.19 | 0.17 |
| $ZrO_2$ | 0.01 |  |  |
| $Fe_2O_3$ | 0.01 |  |  |
| $As_2O_3$ |  |  |  |
| CTE ($\times10^{-7}C^{-1}$) | 74.6 | 83.6 | 80.1 |

In some embodiments, the glass clad layers may be formed from one or more of the glass clad layer compositions listed in Table 2 below. However, it should be understood that other compositions for the glass clad layers 104a, 104b are contemplated and possible.

TABLE 2

Exemplary Glass Clad Layer Compositions

|  | 2-1 | 2-2 | 2-3 | 2-4 | 2-5 | 2-6 | 2-7 |
|---|---|---|---|---|---|---|---|
| $SiO_2$ | 69.44 | 67.55 | 62.93 | 64.59 | 60.48 | 62.39 | 67.29 |
| $Al_2O_3$ | 12.36 | 11 | 10.74 | 7.38 | 11.55 | 17.21 | 6.47 |
| $B_2O_3$ | 4.35 | 9.83 | 13.16 | 16.45 | 17.6 | 10.5 | 20.99 |
| $Na_2O$ |  |  |  |  | 0.05 |  |  |
| $K_2O$ |  |  |  |  | 0.022 |  |  |
| MgO | 4.01 | 2.26 | 3.58 | 2.21 | 1.38 | 1.41 | 0.35 |
| CaO | 5.98 | 8.73 | 7.32 | 8.14 | 7.01 | 7.51 | 4.49 |
| SrO | 1.73 | 0.52 | 2.17 | 1.11 | 1.86 | 0.83 | 0.29 |
| BaO | 1.98 |  | 0.01 | 0.01 | 0.02 |  | 0.01 |
| $SnO_2$ | 0.1 | 0.07 | 0.07 | 0.06 | 0.208 | 0.16 | 0.05 |
| $ZrO_2$ | 0.03 | 0.02 |  |  | 0.14 |  | 0.05 |
| $Fe_2O_3$ | 0.02 | 0.01 | 0.01 | 0.01 | 0.039 |  | 0.05 |
| $As_2O_3$ |  |  |  |  | 0.0004 |  |  |
| CTE ($\times10^{-7}C^{-1}$) |  |  |  |  | 35.6 | 31.7 | 30.9 |

A variety of processes may be used to produce the laminated glass articles described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

Figure 2:
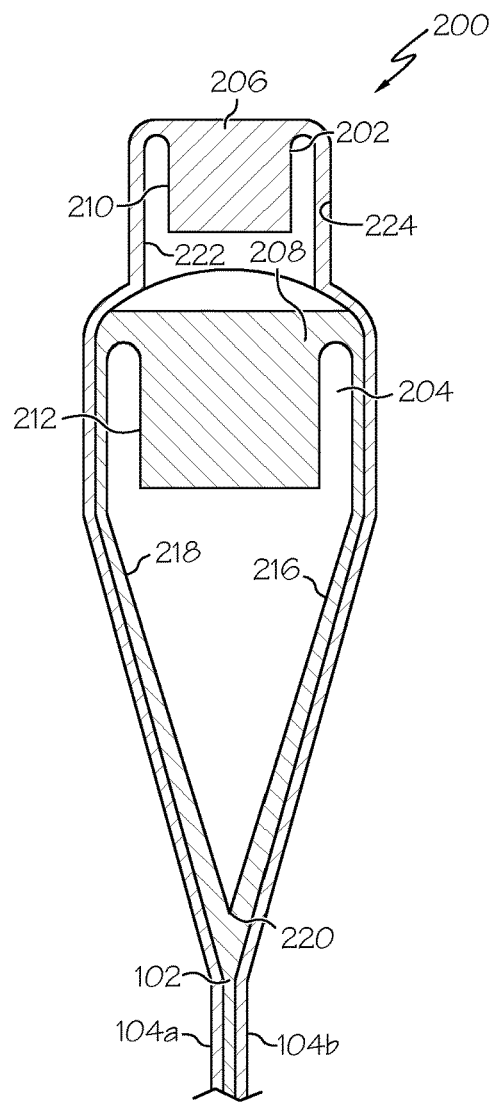
FIG. 2 schematically depicts an apparatus for forming a laminated glass article according to one or more embodiments shown and described herein.

In one particular embodiment, the laminated glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass clad composition 206 is fed from a melter (not shown). Similarly, the lower overflow distributor 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 102 of a laminated glass article.

Simultaneously, the molten glass clad composition 206 overflows the trough 210 formed in the upper overflow distributor 202 and flows over outer forming surfaces 222, 224 of the upper overflow distributor 202. The molten glass clad composition 206 is outwardly deflected by the upper overflow distributor 202 such that the molten glass clad composition 206 flows around the lower overflow distributor 204 and contacts the molten glass core composition 208 flowing over the outer forming surfaces 216, 218 of the lower overflow distributor, fusing to the molten glass core composition and forming glass clad layers 104a, 104b around the glass core layer 102.

While FIG. 2 schematically depicts a particular apparatus for forming planar laminated glass articles such as sheets or ribbons, it should be appreciated that other geometrical configurations are possible. For example, cylindrical laminated glass articles may be formed, for example, using the apparatuses and methods described in U.S. Pat. No. 4,023,953.

In some embodiments, the molten glass core composition 208 generally has an average core coefficient of thermal expansion $CTE_C$ which is greater than the average clad coefficient of thermal expansion $CTE_{CL}$ of the molten glass clad composition 206. Accordingly, as the glass core layer 102 and the glass clad layers 104a, 104b cool, the difference in the coefficients of thermal expansion of the glass core layer 102 and the glass clad layers 104a, 104b causes a compressive stresses to develop in the glass clad layers 104a, 104b. The compressive stress increases the strength of the resulting laminated glass article.

In some other embodiments, the molten glass core composition 208 generally has an average core coefficient of thermal expansion $CTE_C$ which is similar to the average clad coefficient of thermal expansion $CTE_{CL}$ of the molten glass clad composition 206. In this embodiment, after the glass core layer 102 and the glass clad layers 104a, 104b cool and solidfy, the resulting laminated glass article may undergo further processing, such as by heat treatment or the like, in order to ceram at least one of the glass core layer 102 and/or the glass clad layers 104a, 104b which, in turn, changes the CTE of the layer and results in compressive stress being formed in the glass clad layers 104a, 104b of the laminated glass article. For example, in one embodiment, the glass core layer 102 may be formed from a glass ceramic material which precipitates a crystalline phase upon heat treatment, thereby increasing the core coefficient of thermal expansion $CTE_C$ relative to the glass clad layers 104a, 104b. The resulting difference in the coefficient of thermal expansion causes compressive stress to develop in the glass clad layers 104a, 104b. In another embodiment, the glass clad layers 104a, 104b may be formed from a glass ceramic material which precipitates a crystalline phase upon heat treatment, thereby decreasing the clad coefficient of thermal expansion $CTE_{CL}$ relative to the glass core layer 102. The resulting difference in the coefficient of thermal expansion causes compressive stress to develop in the glass clad layers 104a, 104b.

Referring again to FIG. 1, as noted herein, the method of forming the laminated glass articles by the fusion process initially results in a continuous ribbon of glass. Thus, discrete laminated glass articles can be singulated or separated from the continuous ribbon of glass. Upon separation from the continuous ribbon of glass, the core layer of the laminated glass article is exposed. In embodiments where the laminated glass article 100 is strengthened, either during formation or as a result of ceramming after formation, the glass clad layers 104a, 104b exposed at the edge 106 of the laminated glass article 100 are in compression due to strengthening while the glass core layer 102 exposed at the edge 106 of the laminated glass article is in tension. Because of this tensile stress in the glass core layer 102, the glass core layer 102 is particularly susceptible to damage which may lead to catastrophic failure (i.e., complete fracture) of the laminated glass article 100. Further, the process of singulating the discrete laminated glass articles from the continuous ribbon of glass may also leave flaws in the cut edges of the glass, which flaws may serve as an initiation point for cracks. The methods described herein may be used to both finish and strengthen the edges of laminated glass articles and assist in mitigating failures originating at the edges of the laminated glass articles.

Edges of these singulated laminated glass articles may be further processed with conventional finishing processes including grinding with fixed abrasive formed wheels, or chamfering, lapping, and polishing. For example, sharp or square scored edges of the laminated glass articles may undergo an edging or chamfering process to eliminate residual score and break damage that can lead to relatively low edge strengths in comparison to the intrinsic strength of the glass. This relatively low edge strength may subsequently lead to glass failure under an applied load. Residual damage occurring from the edging and chamfering processes may be removed by additional polishing steps, which additional steps increase the cost of production of the laminated glass article.

These conventional finishing processes have resulted in edge strength from about 90 MPa to 200 MPa depending on the type of laminated glass and the process used to score and break and/or separate laminated glass edges to form the singulated discrete laminated glass articles. These edge strengths are relatively low and leave the laminated glass article susceptible to failure from damage incident on the edge of the laminated glass article.

To finish and strengthen the edge 106 of the laminated glass article and reduce its susceptibility to failure, the edge 106 of the laminated glass article 100 may be further processed.

Mechanical edging or chamfering processes or combinations thereof may increase the strength of edges 106 of laminated glass articles 100. However, these processes have not been known to achieve a target edge strength of greater than or equal to about 400 MPa in the edges of laminated glass articles. Another technique which may be utilized to enhance edge strength following conventional mechanical edge finishing processes is chemical etching. For example, one type of chemical etching step referred to as a conventional edge strengthening process is set forth in U.S. Patent App. Publ. No. 2014/0065401, entitled "GLASS ARTICLES WITH HIGH FLEXURAL STRENGTH AND METHOD OF MAKING," published Mar. 6, 2014, which reference is incorporated herein in its entirety, (hereinafter, the "conventional edge strengthening process"). The conventional edge strengthening process may be used to strengthen the edges 106 of a laminated glass article 100.

Figure 3:
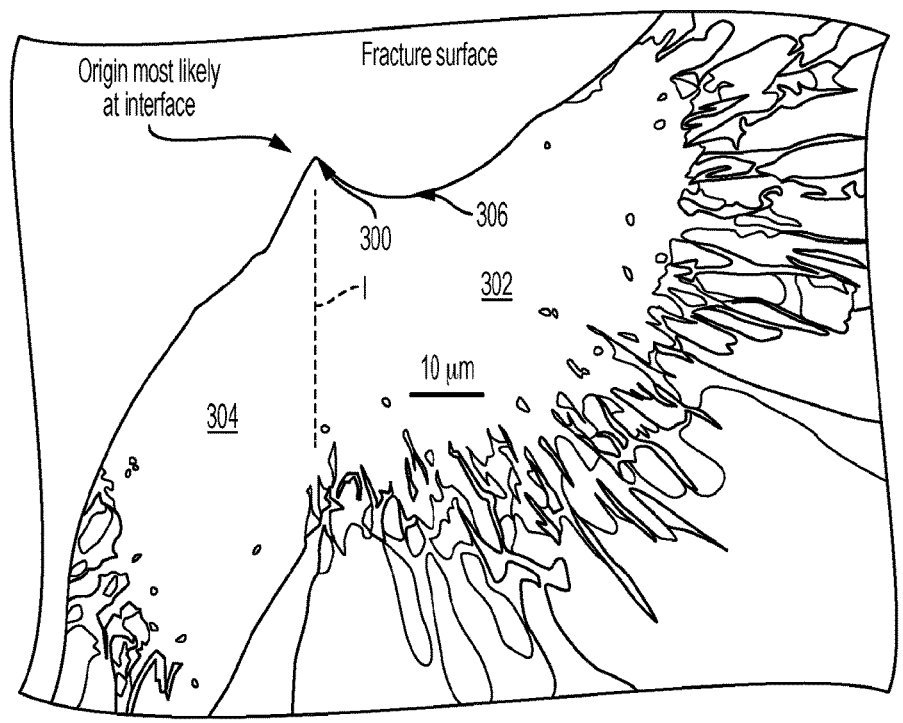
FIG. 3 is an exemplary microscopic image showing preferential etching at an interface of a laminated glass article.

However, due to differences in the chemical durability of the clad and the core layers of laminated glass articles formed by the fusion process, the conventional edge strengthening process may also diminish the edge strength of the laminated glass articles. For example, the conventional edge strengthening process may result in the preferential removal of material at the clad/core interface between the clad and core layers. To illustrate this effect, a conventional edge strengthening process was applied to strengthen the edge 106 of a laminated glass article 100. The process was applied for approximately sixteen minutes and resulted in a non-uniform edge profile as shown in FIG. 3. Specifically, FIG. 3 is a magnified image of an edge of a laminated glass article having a thickness of 0.7 mm illustrating preferential etching at an interface of such a clad and core layer. That is, preferential etching and removal of material occurred at the interface of the clad and core layers during application of the conventional edge strengthening process. Specifically, peak 300 in FIG. 3 delineates a clad/core interface of the glass article along axis I. To the right of axis I is the core layer 302, and to the left of axis I is the clad layer 304. To the right of peak 300 is a valley 306 created by the preferential etching and removal of material at the clad/core interface layer from the conventional edge strengthening process. This preferential removal of material degrades the edge strength of the glass article such that a target edge strength of 400 MPa is not met. Aside from the possibility of decreasing the edge strength in some laminated glass article, the addition of a chemical etching process, such as the conventional edge strengthening process, adds significantly to the cost of manufacturing laminated glass articles.

Embodiments herein are directed to an edge processing technique different than the conventional edge strengthening process described above or another, similar chemical etching step. The edge processing techniques described herein may be utilized to reach a target edge strength of greater than or equal to 400 MPa in laminated glass articles formed by the fusion process. The cut or unprocessed edges of the laminated glass articles may be created when the laminated glass articles are singulated from a continuous ribbon of laminated glass or from a larger sheet of laminated glass (i.e., a mother sheet). For example, in some embodiments, singulation may be accomplished by an ultra-short laser pulse system used to laser score the laminated glass articles which are, thereafter separated from the remaining glass of the ribbon or sheet, leaving the laminated glass articles with cut or unprocessed edges. Alternatively, the laminated glass articles may be mechanically scored to separate the laminated glass articles from a continuous glass ribbon or a mother sheet. Such cut or unprocessed edges of the laminated glass articles may then be finished and strengthened utilizing the methods described herein. In one embodiment described herein, a loose abrasive polishing system is used to apply a slurry to a cut glass edge of a laminated glass article via a slurry delivery system utilizing a rotating brush. For example, such a polishing system is commercially available from Shoda Techtron Corp. of Japan, such as edge polishing machines with model number BPM-380C/570B that utilize a slurry delivery system with a nylon rotating brush (hereinafter, "edge polishing machines"). The slurry may include loose abrasive material (i.e., polishing media). For example, in some embodiments, the slurry contains $CeO_2$ particulates having a density of 1.3 $g/cm^3$ or about 1.3 $g/cm^3$. Advantageously, such a polishing step may be applied to a cut edge of a laminated glass article with or without the need for an intermediate edging (or grinding) step and still result in an average strength value of greater than or equal to the target of 400 MPa. However, it should be understood that the polishing step may be utilized in conjunction with one or more grinding steps in order to created laminated glass articles having the desired edge strength.

In embodiments, singulated laminated glass articles may be stacked and the loose abrasive polishing process as described herein is applied to the entire stack. In embodiments, the stack of laminated glass articles may include up to about 250 laminated glass articles. In some other embodiments, the stack of laminated glass articles may include from about 50 to about 250 laminated glass articles. In some other embodiments the stack may include from about 50 to about 200 laminated glass articles. However, it should be understood that the methods described herein may be used to treat individual laminated glass articles. When individual glass articles are treated according to the polishing methods described herein, sacrificial top and bottom glass articles may be used to surround an individual laminated glass article to be treated, thereby protecting the surface of the individual laminated glass article. Processing a plurality of laminated glass articles in a single stack may be suitable and desirable for mass production, and visual inspection of such stacks treated by embodiments described herein revealed no substantial negative effects to the surfaces (as opposed to the cut edges) of the so-processed glass articles.

In some embodiments, the edge polishing processes described herein may be utilized in conjunction with a beveling process for treating the cut edges of laminated glass articles by mechanical grinding. More particularly, the methods for strengthening an edge of a laminated glass article described herein may be utilized in conjunction with a bevel process in which the edges of a singulated laminated glass article (alone or in a stack of singulated laminated fusion glass articles) are beveled using an abrasive assist process to produce a laminated glass article with an edge strength of greater than or equal to a target strength of 400 MPa. In embodiments, beveling the edges may mean treating the edges of the laminated glass article to produce an edge profile that deviates from the original flat, rectangular shape. This beveling process may include a grinding step. Such an edge finishing process incorporating a beveling process may be utilized to mass produce laminated glass articles for use in, for example, display applications or as cover glasses for electronic device, etc.

Further, the edge polishing processes described herein may also be utilized with an etching step. While it has been found that the edge polishing process described herein, utilized alone or in conjunction with an edge beveling process, increases the edge strength of laminated glass articles formed by the fusion process to greater than or equal to 400 MPa, it has also been found that adding an etching step to the polishing process may result in a further improvement in the edge strength by approximately 10%. This etching step may be rapidly performed in a time period of less than 3 minutes. Such a shortened etching timeframe in comparison to the more traditional 16 minute etching step described above with the aforementioned conventional edge strengthening process may reduce residual contamination of the glass edges of the laminated glass articles due to the etching process.

Figure 4:
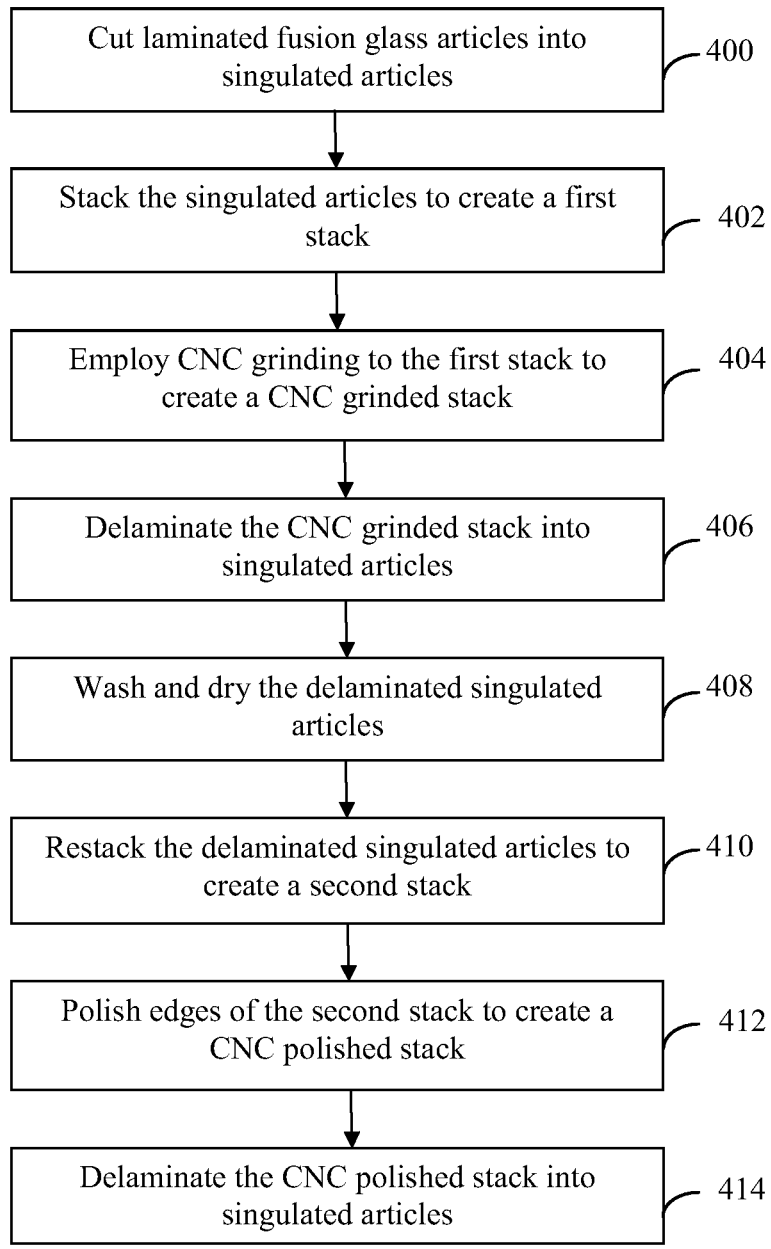
FIG. 4 is a flow chart of process steps to treat laminated glass articles and strengthen the edges of the laminated glass articles according and applicable to one or more embodiments shown and described herein.

Referring now to FIG. 4, in one embodiment, a method for strengthening the edge of laminated glass articles includes the step 400 of cutting laminated glass into singulated laminated glass articles, for example, using laser separation techniques, mechanical separation techniques or combinations thereof. Thereafter, in step 402, the singulated laminated glass articles are stacked via a stacking process to create a first stack of laminated glass articles. The stacking process will be described in further detail herein with specific reference to FIGS. 5 and 6(a)-6(h). In step 404, a computer numerical control (CNC) machine may be used to grind the stack by employing a CNC grinding operation to the sides of the first stack to remove glass material from the cut edges of each of the laminated glass articles within the stack, thereby forming a CNC ground stack. In step 406, the CNC ground stack is unstacked. That is, the laminated glass articles within the stack are removed from the stack to allow for the individual treatment of each laminated glass article apart from the remainder of the stack. In embodiments, the CNC ground stack may be unstacked by positioning the CNC ground stack in an ultrasonic bath with a solvent such as water, alcohol, or the like. In step 408, the individual laminated glass articles are washed and dried to remove any residue from the stacking process and/or the CNC grinding process. In step 410, the individual laminated glass articles are restacked into a second stack. In embodiments, the individual glass articles are restacked using a commercial plate stacking system such as a stacking system commercially available from Shoda Techtron Corp. of Japan. Thereafter, in step 412, the edges of the singulated glass articles of the second stack are polished. In embodiments, the polishing may be performed by CNC brush polishing using an edge polishing machine with loose abrasive entrained in a slurry to create a CNC polished stack. In step 414, the CNC polished stack is unstacked after edge polishing to remove the individual laminated glass articles from the CNC polished stack. The individual laminated glass articles are then washed and dried and then prepared for further processing and/or final packaging and distribution.

The unstacking and restacking steps (e.g., steps 402 and 410, respectively) can enable the spacing between individual laminated glass articles to be different for different processing steps. During the grinding step (e.g., grinding step 404), adjacent individual laminated glass articles may be spaced from one another by a grinding spacing. During the polishing step (e.g., polishing step 412), adjacent individual laminated glass articles may be spaced from one another by a polishing spacing. In embodiments, the grinding spacing may be greater than the polishing spacing. In other embodiments, the grinding spacing may be less than the polishing spacing. In other embodiments, the grinding spacing may be equal or substantially equal to the polishing spacing.

Figure 5A:
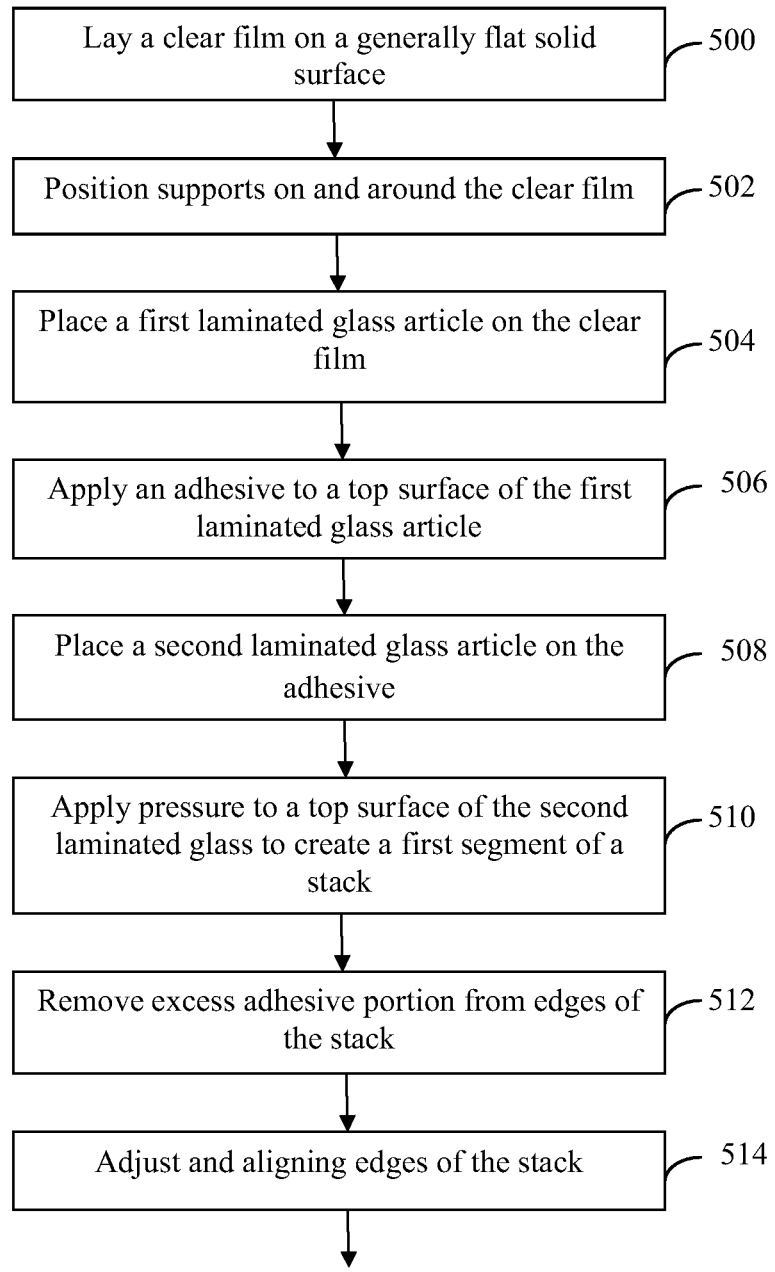
FIGS. 5(*a*)-5(*b*) are flow charts outlining stacking steps of a process for strengthening the edges of laminated glass article, such as the process detailed in FIG. 4, according and applicable to one or more embodiments shown and described herein.
Figure 5B:
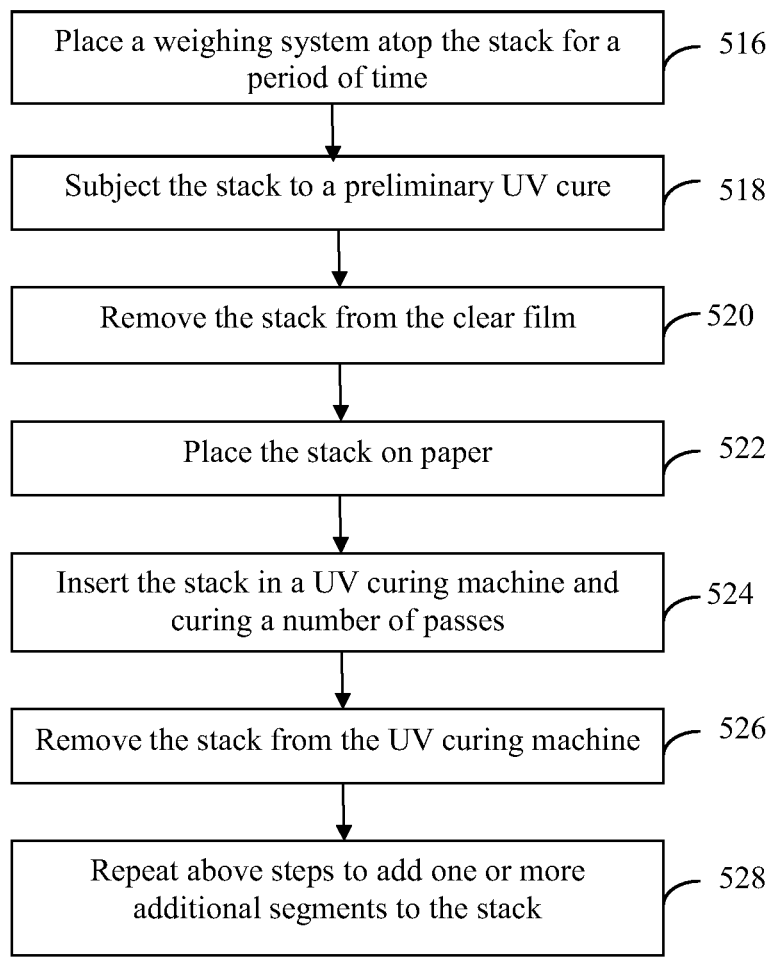

In one embodiment, the stacking process of step 402 and the restacking process of step 410 may include the steps described in the flow diagrams of FIGS. 5(a) and 5(b), which steps are illustrated in FIGS. 6(a)-6(h). For example, stacking of the as cut laminated glass articles may be performed manually, as described below, with an ultraviolet (UV) curable adhesive and PMMA (Poly(methyl methacrylate)) spherical spacers positioned between the individual laminated glass articles of the stack to avoid contact between adjacent surfaces of at least two individual laminated glass articles. In embodiments, the spherical spacers are configured such that the grinding spacing is at least about 20 µm, at least about 30 µm, or at least about 35 µm. Additionally, or alternatively, the spherical spacers are configured such that the grinding spacing is at most about 100 µm, at most about 90 µm, at most about 80 µm, at most about 70 µm, at most about 60 µm, at most about 50 µm, or at most about 45 µm.

Figure 6A:
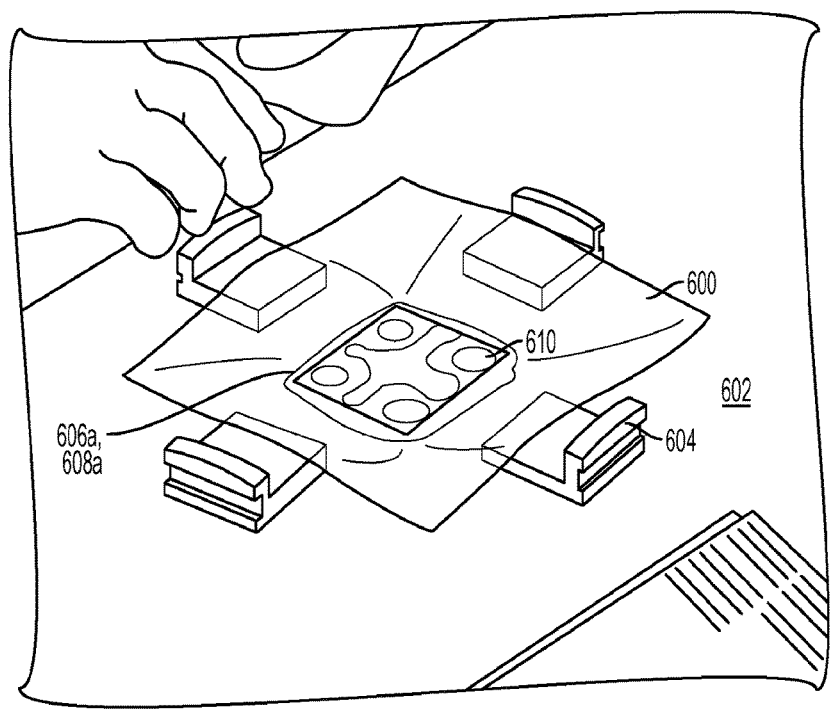
FIGS. 6(a)-6(h) are images of an exemplary stacking process according to one or more embodiments shown and described herein.

Referring specifically to FIGS. 5(a)-5(b) and FIG. 6(a), in step 500 a substrate, such as a clear film 600, is laid on a generally flat solid surface such as table 602. In step 502, supports 604 are positioned on and around opposing perimeter positions of film 600 to hold film 600 in a desired position on table 602. In step 504, a first laminated glass article 606a having cut edges 608a is placed on film 600 and spaced apart from supports 604. In step 506, adhesive 610 is applied to a top surface of the first laminated glass article 606a. The adhesive may be a UV curable adhesive or other suitable bonding adhesive. Adhesive 610 may be applied in one of a variety of patterns. For example, adhesive 610 may be applied as a single layer extending across the entire surface of the first laminated glass article (not shown) or in a X-shaped pattern with surrounding dots of adhesive, as shown in FIG. 6(a). Additionally, spacers, such as PMMA spherical spacers, may be positioned on the top surface of the first laminated glass article 606a. Such spacers may measure 40 µm in thickness or be in the range of about 20 µm to 100 µm.

Figure 6B:
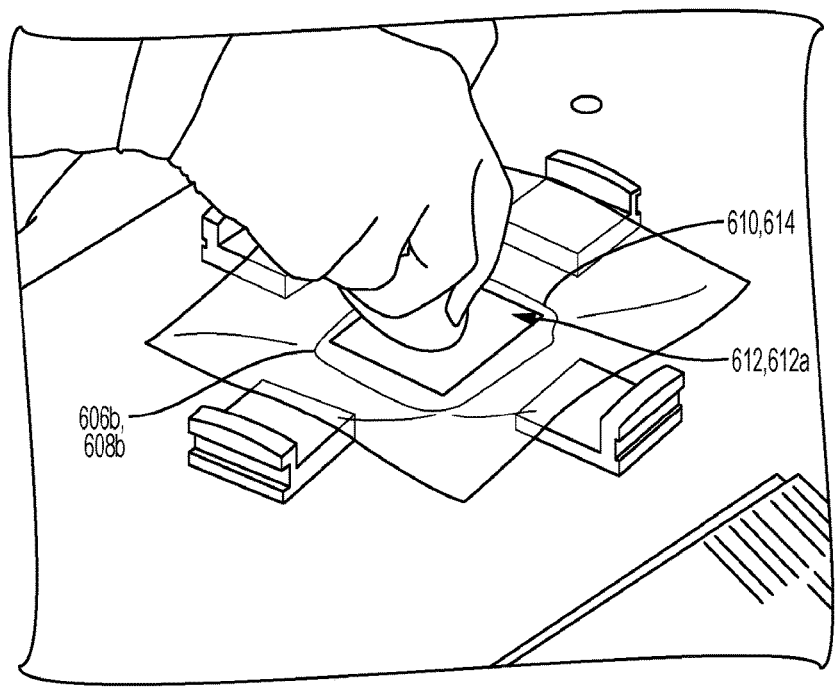
Figure 6C:
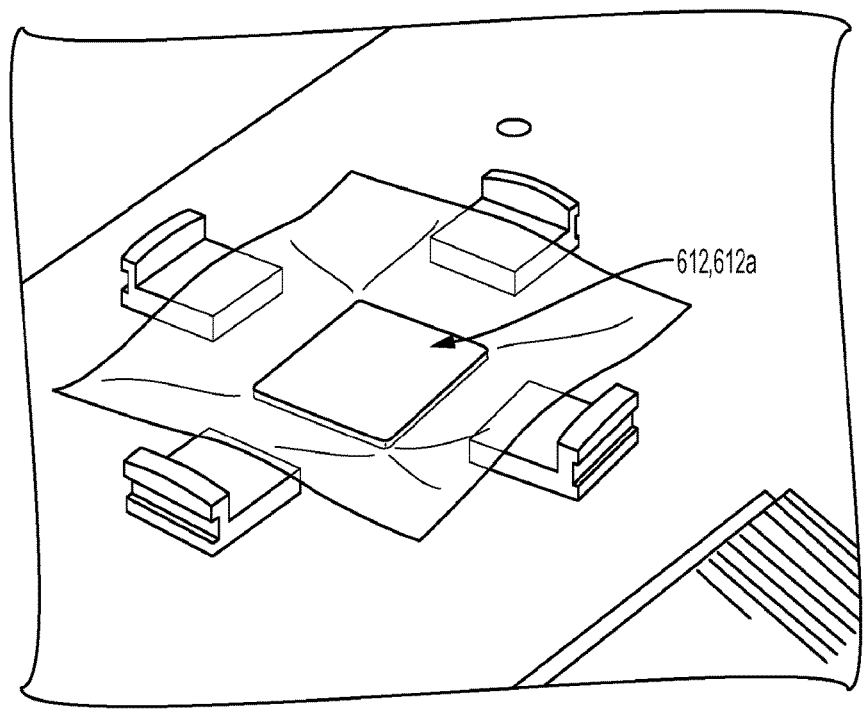
Figure 6D:
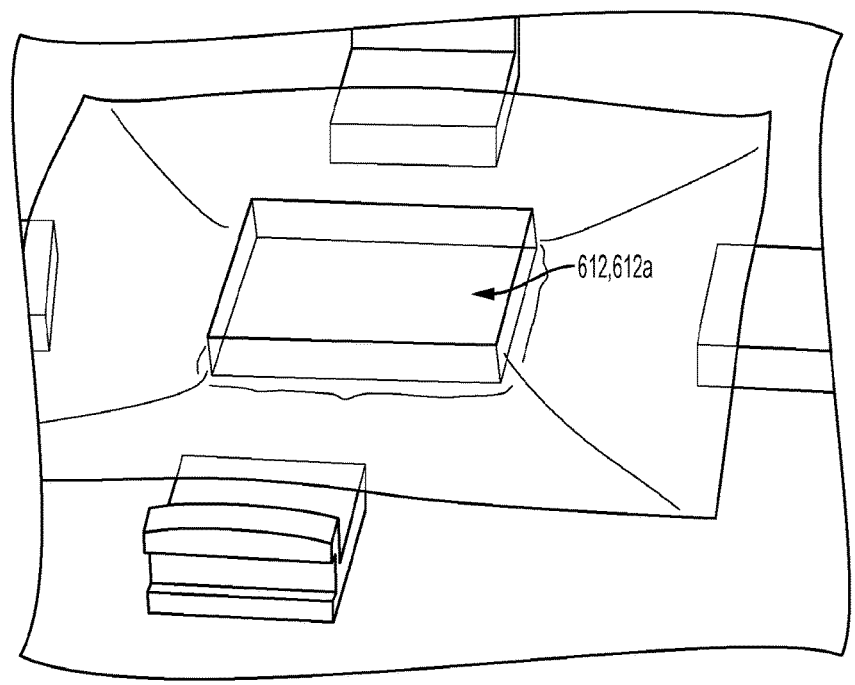

Referring now to FIGS. 5(a)-5(b) and 6(b), in step 508 a second laminated glass article 606b is placed on top of the first laminated glass article 606a and adhesive 610. Thereafter, in step 510, pressure is applied to a top surface of glass article 606b to create a first segment 612a of stack 612. The term "segment," as used herein, refers to two laminated glass articles adhesively but releasably bound together. As shown in FIG. 6B, the application of pressure may cause excess adhesive portions 614 of adhesive 610 to be released past edges 608a and 608b of respective glass articles 606a and 606b of stack 612 and may be deposited on a top surface of the film 600 disposed below stack 612. In step 512, the excess adhesive portions 614 may be removed such as by wiping or the like. FIGS. 6(c) and 6(d) show stack 612 after excess adhesive portions 614 have been removed.

Figure 6E:
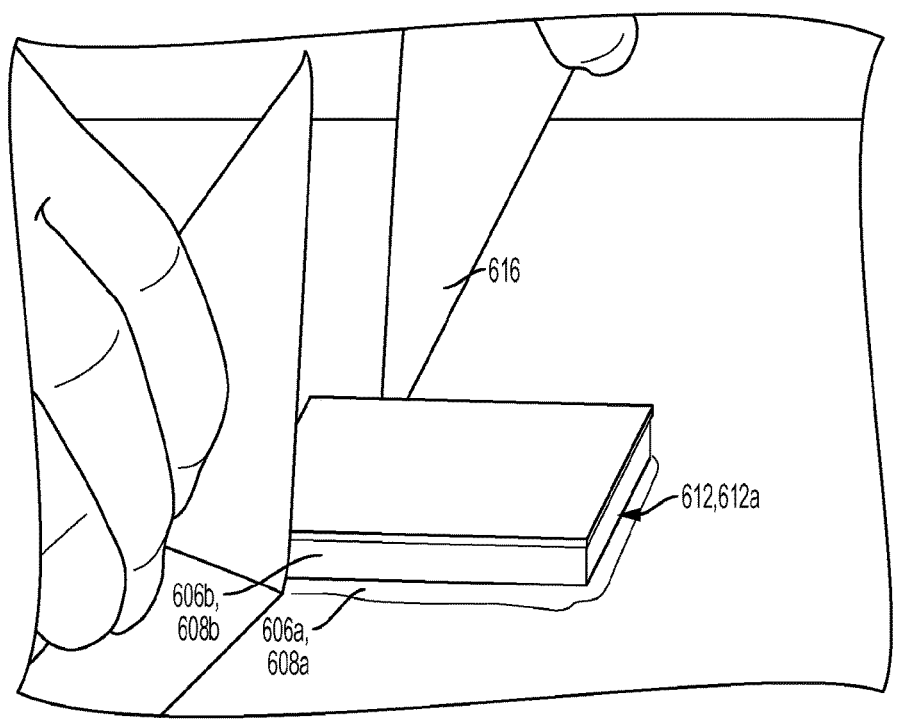
Figure 6F:
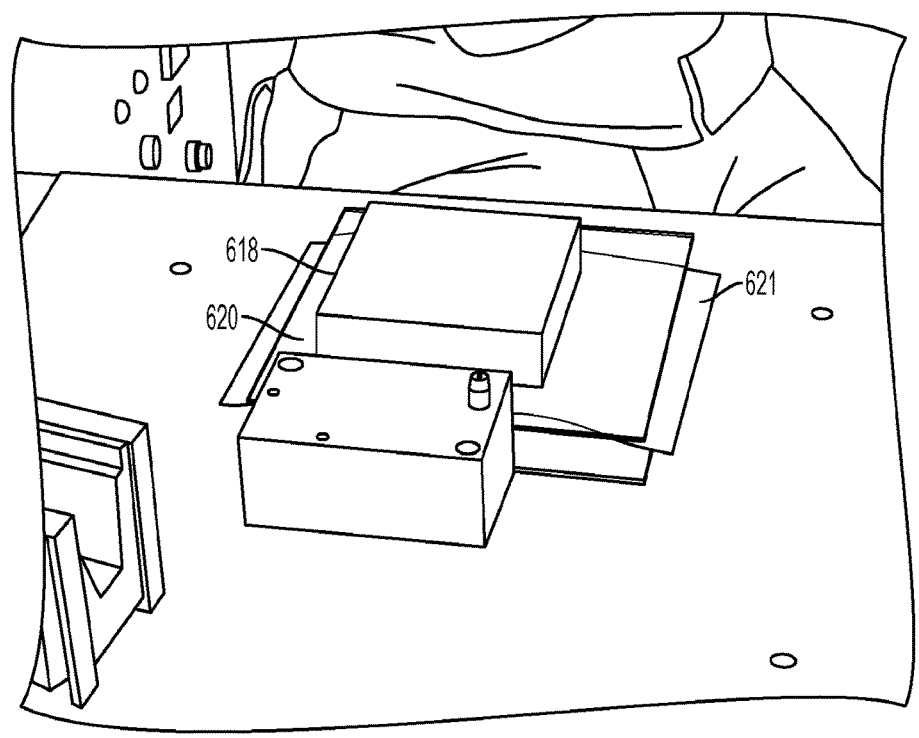

Referring to FIGS. 5(a)-5(b) and 6(e), in step 514, tool 616 is used to adjust edges 608a and 608b to align laminated glass articles 606a and 606b of the first segment 612a of stack 612. In step 516, a weight system, such as deadweight 618, may be placed atop stack 612 as shown in FIG. 6(f) to insure proper adhesion of the laminated glass articles within the first segment 612a of the stack 612. In embodiments, the deadweight 618 may comprise a solid, weighted object such as a solid block of metal, ceramic or even glass. The deadweight 618 may be placed atop the stack 612 for a period of time of up to about 5 minutes. Thereafter, the positioning of individual laminated glass articles within the stack 612 may again be adjusted by use of a tool such as tool 616 and any excess adhesive portions may again be removed, as may be done where excess adhesive portions are present before, after, or during any steps of the process.

In step 518 the stack 612 is exposed to a preliminary UV curing step for a time period from about 1 minute to about 2 minutes. At step 520, stack 612 is removed from the clear film 600 and, at step 522, stack 612 is placed on a clean substrate, such as a paper substrate or the like, having a thickness from of about 0.14 mm to about 0.19 mm. Excess adhesive portions may again be removed from the perimeter of the stack. The preliminary UV curing step can help to ensure that the stack does not shift between stacking and curing (e.g., during transfer from a stacking machine into a UV curing machine). In other embodiments, the preliminary UV curing step may be omitted.

Figure 6G:
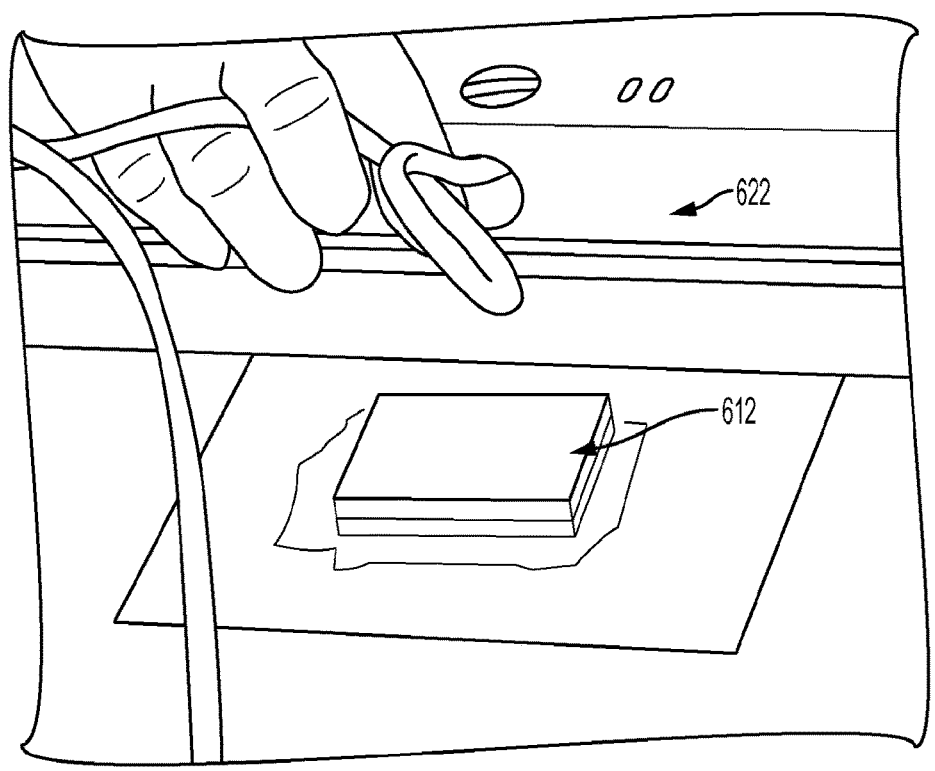
Figure 6H:
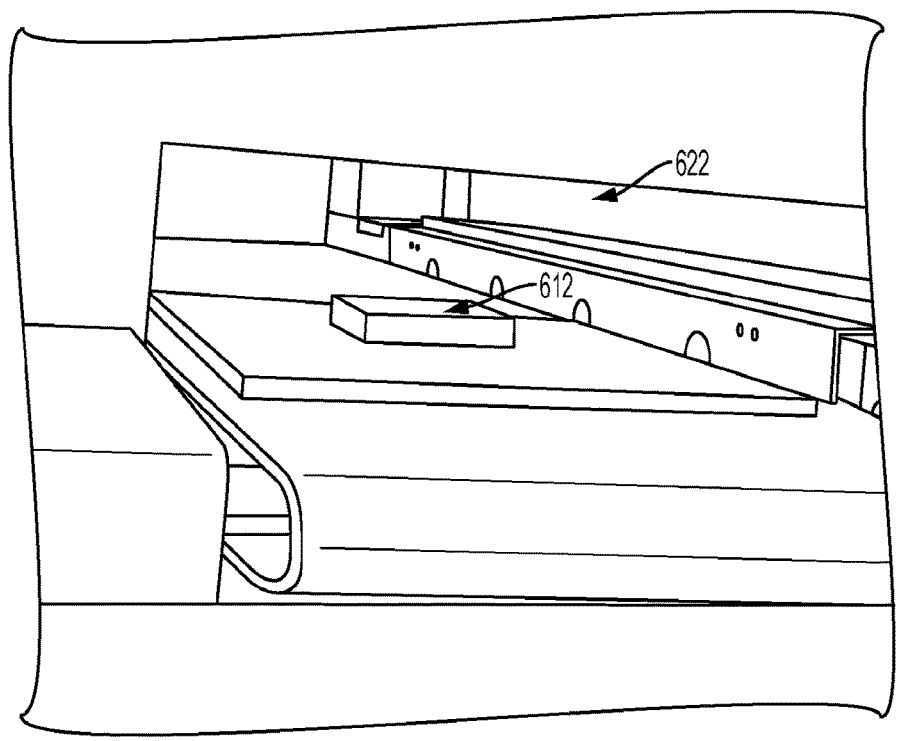

Referring to FIGS. 6(g) and 6(h), at step 524, the stack 612 is subjected to a UV curing process. Specifically, stack 612 is inserted in a UV cure machine 622 and subjected to a suitable amount or number of UV curing radiation cycles. In embodiments, the stack 612 is subjected to two UV curing radiation cycles. At step 526, stack 612 may be removed from UV cure machine 622 and excess adhesive portions again removed. Stack 612 may then be placed on another material such as clear film, paper, or the like. Steps 500 to 526 may then be repeated to add one or more additional segments to the stack of laminated glass articles to create a final stack that includes multiple stacked segments of laminated glass articles.

Figure 7A:
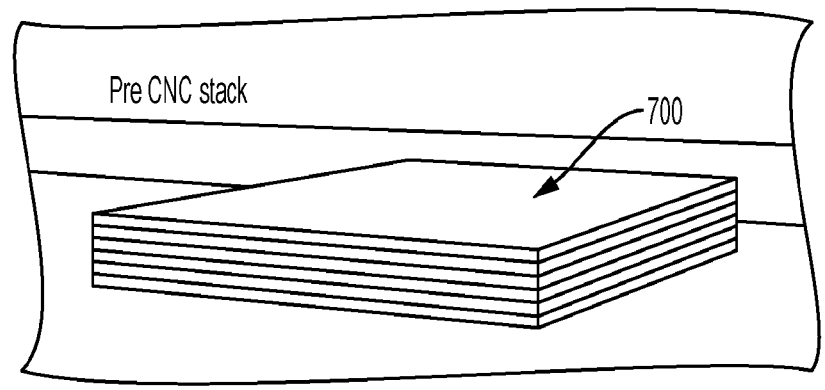
FIG. 7(a) is an image of an exemplary stack of laminated glass articles prior to grinding by a computer numerical control (CNC) machine according to one or more embodiments shown and described herein.
Figure 7B:
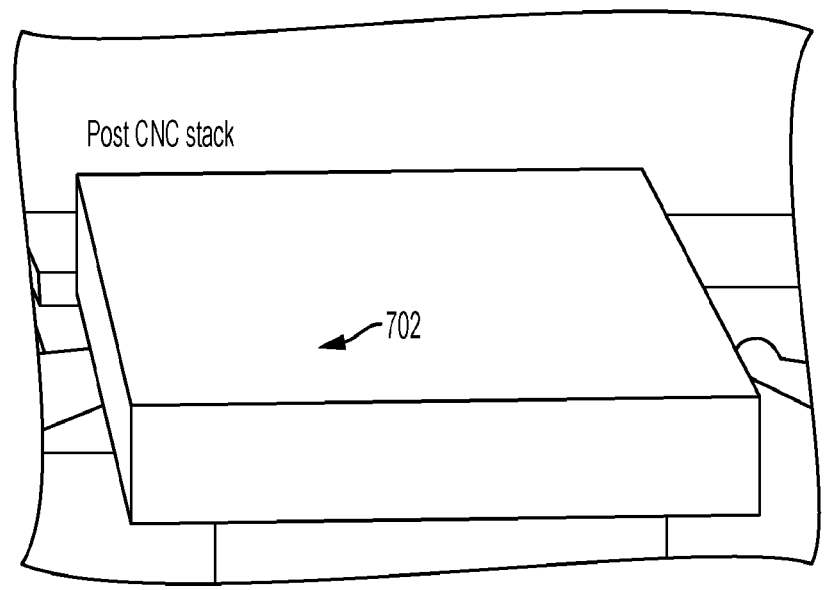
FIG. 7(b) is the stack of FIG. 7(a) after grinding by the CNC machine according to one or more embodiments shown and described herein.
Figure 8A:
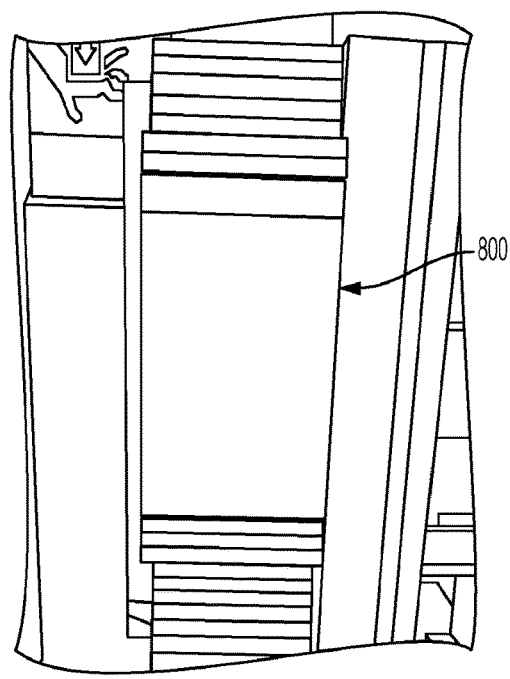
FIG. 8(a) is an image of an exemplary stack of laminated glass articles prior to polishing according to one or more embodiments shown and described herein.
Figure 8B:
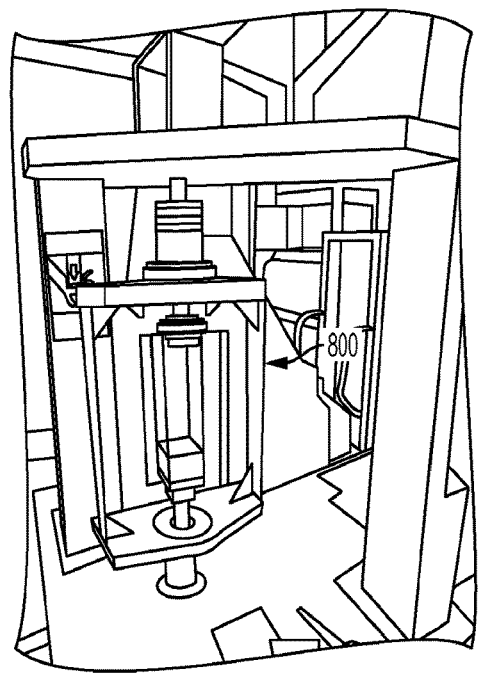
FIG. 8(b) is an image of an exemplary stack of laminated glass articles placed on a stacking fixture for a polishing machine prior to polishing according to one or more embodiments shown and described herein.
Figure 8C:
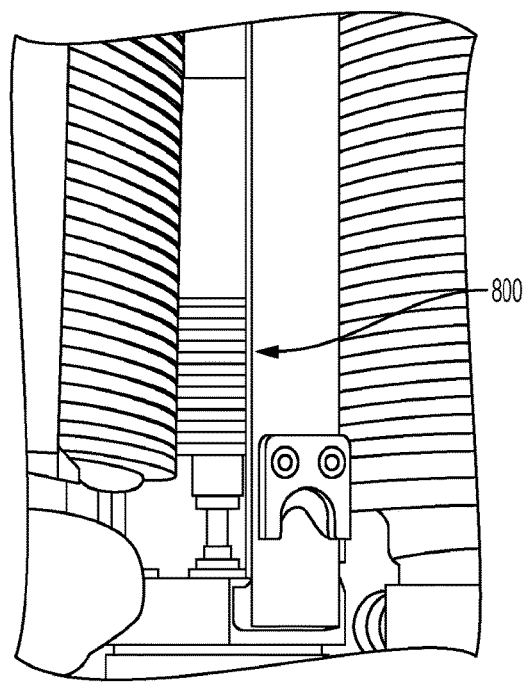
FIG. 8(c) is an image of an exemplary stack of laminated glass articles loaded in a polishing machine prior to polishing according to one or more embodiments shown and described herein.
Figure 8D:
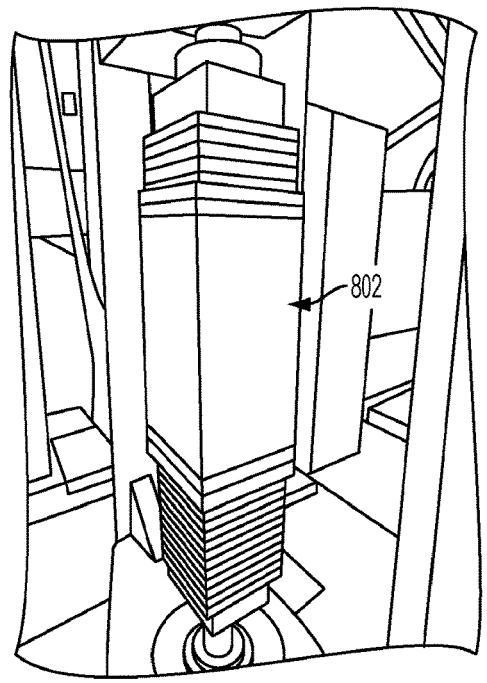
FIG. 8(d) is an image of the stacks of FIGS. 8(a)-8(c) after polishing according to one or more embodiments shown and described herein.

Referring now to FIGS. 7(*a*)-7(*b*), respectively, images of a pre-ground stack 700 and post-ground stack 702 of laminated glass articles are shown before and after a grinding step of the bevel process, such as optional step 404 of FIG. 4. The optional grinding step 404 may include the use of rough and fine abrasive wheels such as rough grinding wheels having 325 grit fixed abrasive particles and fine wheels having 800 grit fixed abrasive particles. A wheel used for the grinding step may either be a formed wheel for grinding singulated laminated glass articles or a flat-faced wheel used to grind a stack of singulated laminated glass articles, as described herein. In embodiments, the grinding process conditions may include 20 mm flat diamond wheels (i.e., a diamond wheel with no grooves included). The rough wheels may be wheels such as those manufactured by Fujiloy Japan, such as a 325 grit metal bonded wheel and a 800 grit electroplated wheel. The wheels may run at 10,000 rpm to 30,000 rpm, such as 20,000 rpm or about 20,000 rpm and have a 50 mm/min to 150 mm/min linear speed, such as a 100 mm/min or about 100 mm/min linear speed. The depth of cut of the rough wheels may be 0.2 mm to 0.5 mm per pass, such as 0.35 mm or about 0.35 mm per pass for one pass, and the depth of cut of the fine wheels may be 0.01 mm to 0.1 mm per pass, such as 0.05 mm or about 0.05 mm per pass for two passes. The rough wheels are used for the initial grinding pass(es) and the fine wheels for the later grinding pass(es) so as to impart a better surface finish to the edges of the laminated glass articles after grinding. It should be understood that grinding wheels with different ranges or abrasive grit and/or types of grinding wheels (e.g., metal bonded, electroplated, etc.) may be employed in the optional grinding step. For example, the rough wheel used may be a metal bonded wheel with abrasive grit in the range of from about a 240 grit to about a 400 grit. The fine wheel may be an electroplated wheel having abrasive grit in the range of from about a 800 grit to about 1200 grit or even 1000 grit to 1200 grit. Alternatively, the fine wheel may be a metal bonded wheel having abrasive grit in the range from about 500 grit to about 800 grit. In yet other embodiments, the fine wheel may be a resin bonded wheel having abrasive grit in the range from about 500 grit to about 3000 grit, or even from about 500 grit to about 1200 grit.

FIGS. 8(*a*)-8(*c*) illustrate, respectively, a stack of as cut laminated glass articles as stack 800 before a polishing step of the bevel process when first stacked (FIG. 8(*a*)), initially positioned within a stacking fixture of a polishing machine (FIG. 8(*b*)), and then fully placed in and engaged with the brushes of the polishing machine (FIG. 8(*c*)). FIG. 8(*d*) depicts the now polished stack 802 after the polishing step.

In some embodiments described herein, singulated laminated glass articles are manually stacked on a stacking tool fixture with stacking tools, such as those commercially available from Shoda Techtron Corp. of Japan to create a stack of laminated glass articles, such as pre-polished stack 800 of FIG. 8(*a*). In other embodiments, singulated laminated glass articles are stacked together onto a special mount associated with a stacking tool and a polishing machine such that the glass to glass spacing between the laminated glass articles from about 0.14 mm to about 0.19 mm. This spacing may be controlled by placing a substrate, such as paper or the like (as described herein), between the individual laminated glass articles. The paper may cover about 85% to 90% of the glass surface area of the stacked laminated glass articles. In embodiments, the pre-polished stack 800 is held together using compression (e.g., by a stack holding tool). Thus, the interface between adjacent laminated glass articles may be free or substantially free of adhesive materials. In other embodiments, an adhesive is used between adjacent laminated glass articles to hold the stick together. In embodiments, the substrate (e.g., paper) is configured such that the polishing spacing is at least about 100 µm, at least about 110 µm, at least about 120 µm, at least about 130 µm, at least about 140 µm, or at least about 150 µm. Additionally, or alternatively, the substrate (e.g., paper) is configured such that the polishing spacing is at most about 220 µm, at most about 210 µm, at most about 200 µm, at most about 190 µm, at most about 180 µm, or at most about 170 µm. The polishing spacing can enable the bristles of the polishing machine to round edge corners of the individual laminated glass articles.

Once stacked and positioned in the mount, stack 800 is then loaded into the polishing machine and polished to create post-polished stack 802. As noted hereinabove, the polishing machine may be a Shoda model number BPM-380C/570B edge polishing machine that uses a circular nylon brush in conjunction with loose abrasive assist polishing media. In embodiments, the polishing media includes $CeO_2$ particulates in a slurry having a density of about 1.3 $g/cm^3$. While specific brush material and polishing media are described herein, it should be understood that brushes formed from other materials and other types of polishing media may be used. The brushes of the polishing machine are utilized to both apply the slurry of polishing media to the perimeter of the stack of laminated glass articles and traverse the polishing media over the surface of the perimeter of the stack of laminated glass articles, thereby facilitating both glass material removal and a polishing action. In the embodiments described herein, the removal of the edge surfaces of the stack of laminated glass articles is done to a removal depth of about 0.05 mm. However, it should be understood that the removal depth may be more or less than about 0.05 mm. In embodiments, the depth of material removal is achieved through consecutive removal passes. For example, in one embodiment, each removal pass is set to remove approximately 8 µm to about 10 µm of material per pass.

After the polishing step, the stack is removed from the mount and unstacked (as discussed above with respect to the unstacking step 414 of FIG. 4). The laminated glass articles are then washed and dried.

EXAMPLES

The embodiments described herein will be further clarified by the following examples.

Example 1

Figure 9:
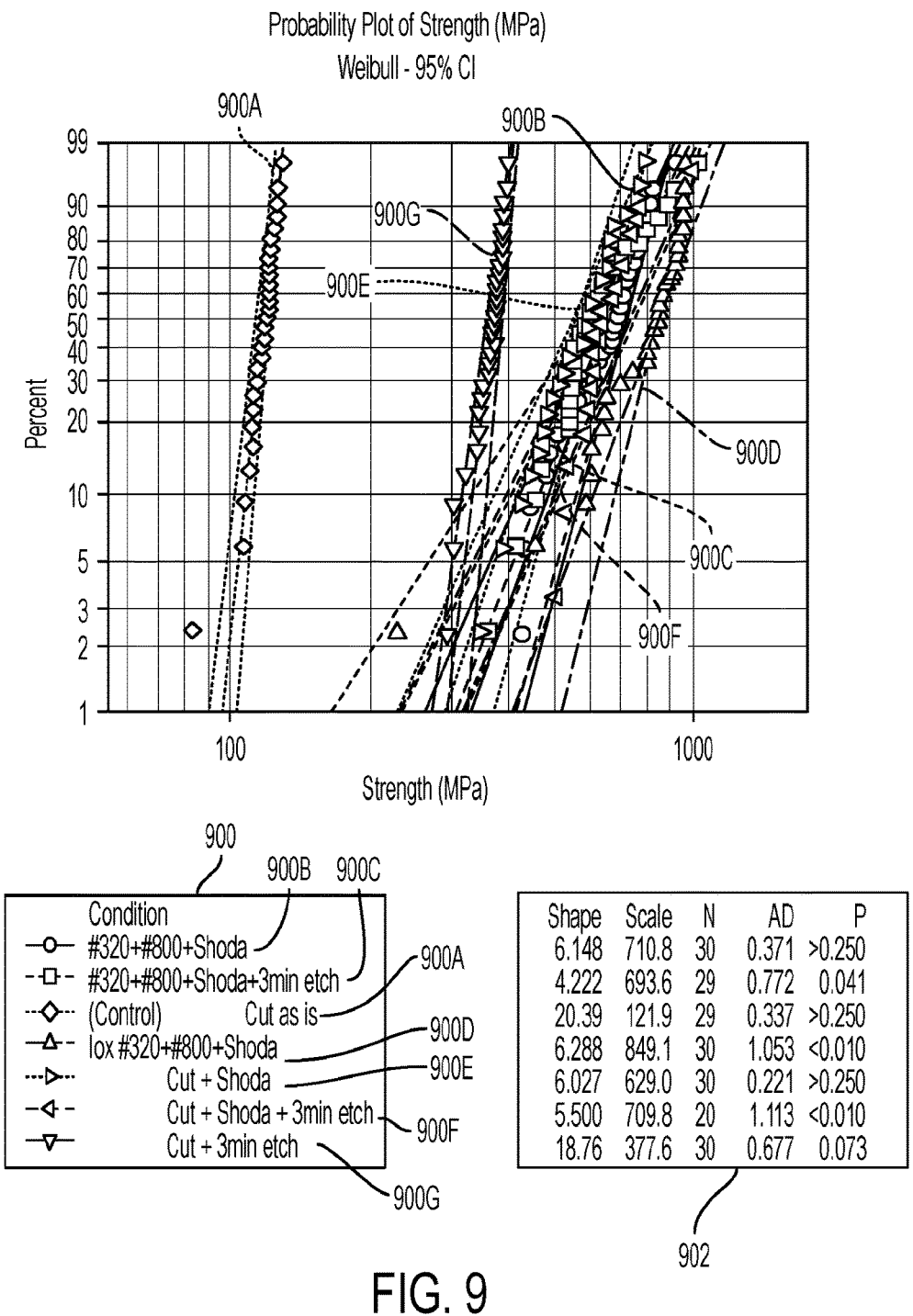
FIG. 9 graphically depicts an exemplary Weibull probability plot of the strength in MPa (x-axis) of different laminate glass articles treated by different post-cutting finishing processes and subjected to a bending strength test against a probability of failure (percent) (y-axis) to illustrate a strength distribution according to one or more embodiments shown and described herein.

A statistical distribution plot obtained by the edge processing methods described herein was created to demonstrate the improvement in the magnitude of edge strength post-processing to determine whether a target edge strength of greater than or equal to 400 MPa would be met by laminate glass articles exposed to different post-processing methods. FIG. 9 graphically depicts the failure probability, in four point bending, for laminated glass articles subjected to different processing conditions. The strength can be determined as described in ASTM C1161-13 "Standard Test Method for Flexural Strength of Advanced Ceramics at Ambient Temperature." The plot is shown as a Weibull plot with a 90% confidence interval (CI) with strength (e.g., the load at failure) in MPa on the x-axis plotted against a failure percentage on the y-axis. The conditions in the legend refer to the different types of materials and processes used to produce the samples tested. The glass materials tested included IOX glass (i.e., a CONCORE™ IOX glass was used) and a CORNING® Incorporated glass (hereinafter, "CORNING glass").

A laser cut laminated fusion glass article utilizing the CORNING glass and tested as the control is listed under Condition legend 900 as "(Control) Cut as is" and hereinafter is referenced as Condition 900A. The laser cut laminated glass article or glass of Condition 900A resulted in an edge strength of about 110 MPa B10 value (wherein B10 is a value of the Weibull test to measure or indicate an average strength with about a 10% product population failure rate and a 90% product population reliability rate). Also tested was a CORNING glass referenced as Condition 900B in FIG. 9 that was initially ground by 320 grit metal bonded rough wheels and 800 grit electroplated fine wheels and, thereaafter, polished by a Shoda edge polishing machine as described above. The laser cut laminated glass article or glass of Condition 900B resulted in an edge strength of about 490 MPa B10 value. Another glass or glass article tested was a CORNING glass referenced as Condition 900C in FIG. 9 that was initially ground by 320 grit metal bonded rough wheels and 800 grit electroplated fine wheels and, thereafter, polished with a Shoda edge polishing machine and then subjected to a rapid 3 minute etching process as described above. Another glass article tested was an IOX glass commercially available from Corning, Inc. as CONCORE™ and referenced as Condition 900D in FIG. 9. This glass was initially ground with 320 grit metal bonded rough wheels and 800 grit electroplated fine wheels and then polished by a Shoda edge polishing machine as described above. The laser cut laminated fusion glass article or glass of Condition 900D resulted in a similar edge strength to that of the glasses of Conditions 900B and 900C.

Yet another glass article tested was a CORNING glass referenced as Condition 900E in FIG. 9. The glass was initially polished (without any intermediate grinding step) by a Shoda edge polishing machine. The laser cut laminated glass article or glass of Condition 900E resulted in an edge strength of about 433 MPa B10 value. Yet another glass article tested was a CORNING glass referenced as Condition 900F in FIG. 9 that was directly polished by a Shoda edge polishing machine and then subjected to a rapid 3 minute etching process as described above. The laser cut laminated glass article or glass of Condition 900F resulted in an edge strength of about 470 MPa B10 value. Another glass article tested was a CORNING glass referenced as Condition 900G in FIG. 9. The glass was initially subjected to a rapid 3 minute etching process as described above without any further grinding or polishing steps. The laser cut laminated glass article or glass of Condition 900G resulted in an edge strength of about 330 MPa B10 value, which is below the target edge strength range for laminated fusion glass articles of greater than or equal to 400 MPa.

Further values depicted in Values Legend 902 of the plot of FIG. 5 include Shape, Scale, N, AD, and P. Shape and Scale are Weibull parameters utilized to arrive at a strength valuation per use of calculations such as equations (1)-(5) listed below wherein F(t) is the probability to failure, t is the stress at failure, and Eta (or η) is equal to 2.718281828, N is the number of samples used, AD is an Anderson-Darling statistical value that measures how well data follows a particular distribution, and P is a probability value.

$$F(t) = 1 - e^{-(t/\eta)^\beta} \quad (1)$$

$$\ln(1/(1 - F(t))) = (t/\eta)^\beta \quad (2)$$

$$\ln(\ln(1/(1 - F(t)))) = \beta\ln(t) - \beta\ln(\eta) \quad (3)$$

$$\frac{\ln(\ln(1/(1 - F(t)))) = \beta\ln(\eta)}{\beta} = \ln(t) \quad (4)$$

$$t = e^{\left(\frac{\ln(\ln(1/(1-F(t))))+\beta\ln(\eta)}{\beta}\right)} \quad (5)$$

It should now be understood that the embodiments described herein relate to methods for forming laminated glass articles and, more specifically, to methods for forming laminated fusion glass articles with improved edge strength and laminated fusion glass articles formed thereby. In embodiments, strengthening the edge of the laminated glass article involves using a loose abrasive assist polishing technique on edges of the laminated fusion glass articles, either on a singular article or stack of such laminated fusion glass articles, and with or without grinding and/or chemical etching steps, to achieve a target strength of greater than or equal to 400 MPa.

The beveling process applied to laminated fusion glass articles and utilizing a loose abrasive polishing assist technique as described herein, where the laminated fusion glass articles have a relative difference in the coefficients of thermal expansion between the glass core layer and the glass clad layers, imparts the laminated glass article with a unique residual stress profile which enhances the edge strength of the laminated glass article. Specifically, the resulting laminated glass article includes an edge strength of greater than or equal to 400 MPa with or without intermediate grinding and/or chemical etching steps.

The laminated glass articles described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for strengthening an edge of a glass laminate article, the method comprising:
    creating a stack having an edge profile, the creating comprising:

applying adhesive to a top surface of the first glass laminate article;

placing a second glass laminate article on the top surface of the first glass laminate article, wherein each glass laminate article comprises a glass core layer positioned between a first glass clad layer and a second glass clad layer; and applying pressure to a top surface of the second glass laminate article to create a first segment of the stack, wherein the first and second glass laminate articles of the first segment of the stack are adhesively but releasably bound;

polishing the edge profile of the stack by delivering a loose abrasive material to the edge profile to create a polished stack; and separating the polished stack into two or more polished glass laminate articles, wherein the edge of each polished glass laminate article has an average strength value of greater than or equal to 400 MPa.

2. The method of claim 1, wherein the loose abrasive material is delivered with a rotating brush.

3. The method of claim 2, wherein the rotating brush is circular and comprises nylon bristles.

4. The method of claim 1, wherein the loose abrasive material comprises a slurry comprising $CeO_2$ particulates having a density of about 1.3 g/cm$^3$.

5. The method of claim 1, wherein the polishing the edge profile comprises removing a portion of the edge profile to a removal depth of about 0.05 mm.

6. The method of claim 5, wherein the removing a portion of the edge profile comprises a series of consecutive removal passes, wherein each pass removes from about 8 μm to about 10 μm of material.

7. The method of claim 1, further comprising grinding the edge profile of the stack before polishing the edge profile.

8. The method of claim 7, wherein a grinding spacing between adjacent laminated glass articles during the grinding step is less than a polishing spacing between adjacent laminated glass articles during the polishing step.

9. The method of claim 8, wherein the grinding spacing is 20 μm to 100 μm and the polishing spacing is 100 μm to 220 μm.

10. The method of claim 7, further comprising, separating the ground stack into two or more ground glass laminate articles and stacking the two or more ground glass laminate articles before polishing the edge profile.

11. The method of claim 7, wherein the edge profile of the stack is ground with at least a rough abrasive wheel having fixed abrasive particles and a fine abrasive wheel having fixed abrasive particles.

12. The method of claim 11, wherein the rough abrasive wheel is metal bonded and has fixed abrasive particles in the range of from about 240 grit to about 400 grit.

13. The method of claim 11, wherein the fine abrasive wheel is electroplated and has fixed abrasive particles in the range of from about 800 grit to about 1200 grit.

14. The method of claim 11, wherein the fine abrasive wheel is metal bonded and has fixed abrasive particles in the range of from about 500 grit to about 800 grit.

15. The method of claim 11, wherein the fine abrasive wheel is resin bonded and has fixed abrasive particles in the range of from about 500 grit to about 3000 grit.

16. The method of claim 1, wherein the creating further comprises:

removing excess adhesive from the edge profile of the stack;

adjusting and aligning the edge profile of the stack; and repeating the creating a segment of a stack steps to create one or more additional segments of the stack, wherein each segment of the stack is adhesively but releasably bound to at least another segment of the stack.

* * * * *